Oct. 25, 1966  E. K. HATCH ET AL  3,280,433
SQUEEZE MOLDING MACHINE
Original Filed July 28, 1961  5 Sheets-Sheet 3

INVENTORS
EDMOND K. HATCH &
LEON F. MILLER
BY
Oberlin, Maky & Donnelly
ATTORNEYS Oct. 25, 1966  E. K. HATCH ET AL  3,280,433
SQUEEZE MOLDING MACHINE
Original Filed July 28, 1961  5 Sheets-Sheet 4

INVENTORS
EDMOND K. HATCH &
LEON F. MILLER
BY
Oberlin, Maky & Donnelly
ATTORNEYS

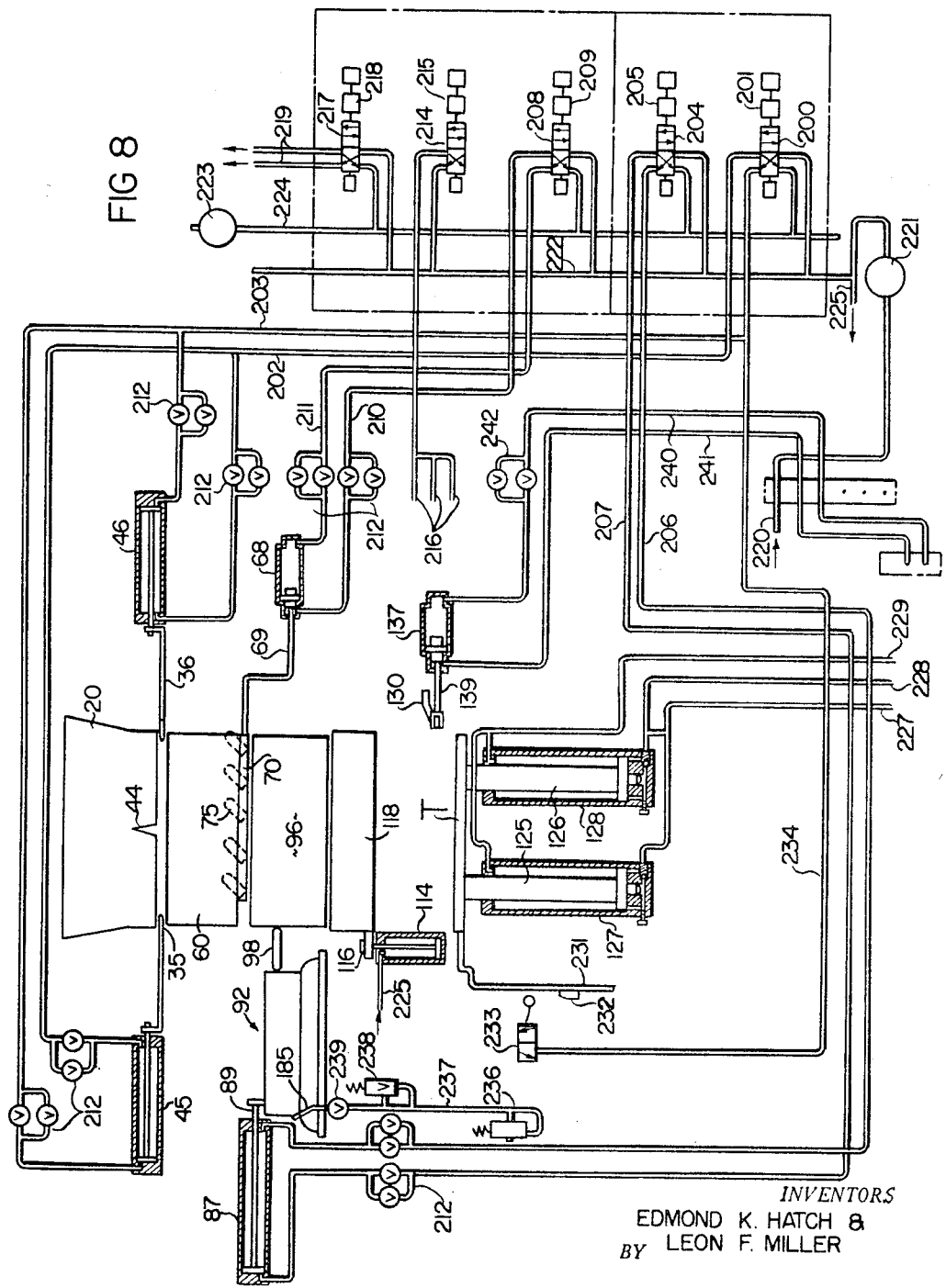

United States Patent Office 3,280,433
Patented Oct. 25, 1966

3,280,433
SQUEEZE MOLDING MACHINE
Edmond K. Hatch, Brecksville, and Leon F. Miller, Rocky River, Ohio, assignors to The Osborn Manufacturing Company, Cleveland, Ohio, a corporation of Ohio
Original application July 28, 1961, Ser. No. 127,616, now Patent No. 3,220,066, dated Nov. 30, 1965. Divided and this application Apr. 15, 1965, Ser. No. 448,502
6 Claims. (Cl. 22—42)

This is a division of application, Serial No. 127,616, filed July 28, 1961, entitled "Squeeze Molding Machine" now Patent No. 3,220,066.

This invention relates generally, as indicated, to a squeeze molding machine and more particularly to a foundry molding machine adapted to produce foundry molds of uniform desired hardness quickly and automatically.

Relatively thin flexible diaphragms have heretofore been employed in foundry molding machines to provide a uniform squeeze pressure on the top surface of a sand mold within a flask. However, at the extremely high squeezing pressures necessary to obtain molds of the proper uniform hardness, such diaphragms frequently rupture necessitating the replacement of the entire squeeze head. This results in considerable down time for the molding machine and where an entire molding system is involved, the loss of time and money is substantial.

It is accordingly a principal object of the present invention to provide a simplified machine which will quickly and rapidly produce sand foundry molds of uniform hardness.

It is another main object to provide a foundry molding machine utilizing a shuttle type head wherein the head may be shifted into and out of operative position to facilitate the direct overhead gravity filling of foundry flasks within the machine.

It is a further important object to provide a squeeze head for such foundry molding machine which is accessible and easy to replace and which will provide a uniform squeezing pressure over the entire surface of the sand mold.

It is a still further object to provide such squeezing head which will exert a variable uniform squeezing pressure on the sand mold and yet which will be extremely durable during operation of the machine requiring less downtime for repairs and squeeze head changes.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 8 is a schematic piping diagram of the hydraulic and pneumatic controls of the machine of FIG. 1.

Figure 1:
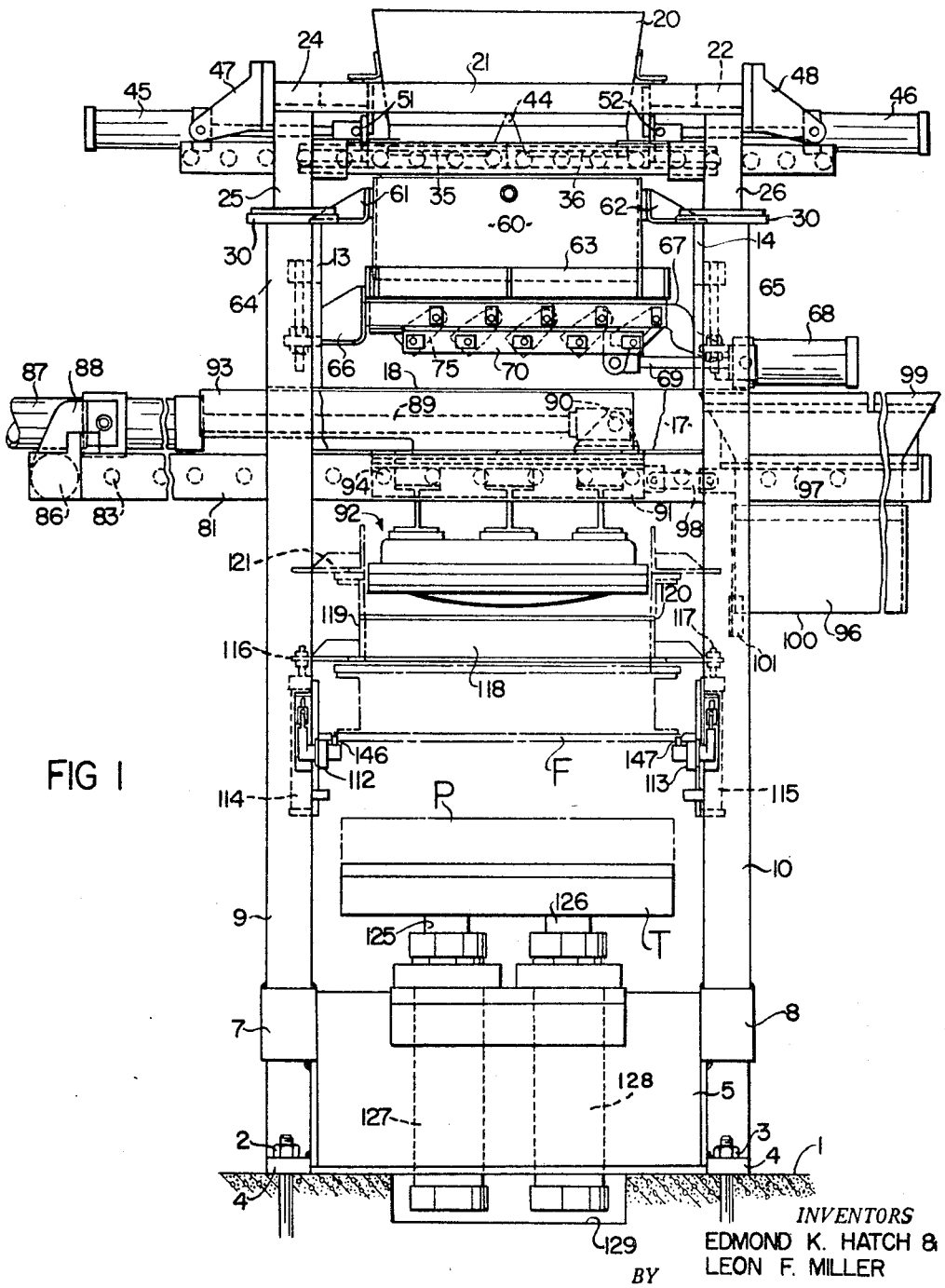
FIG. 1 is a front elevation of a machine in accordance with the present invention employing a unique diaphragm squeeze head.
Figure 2:
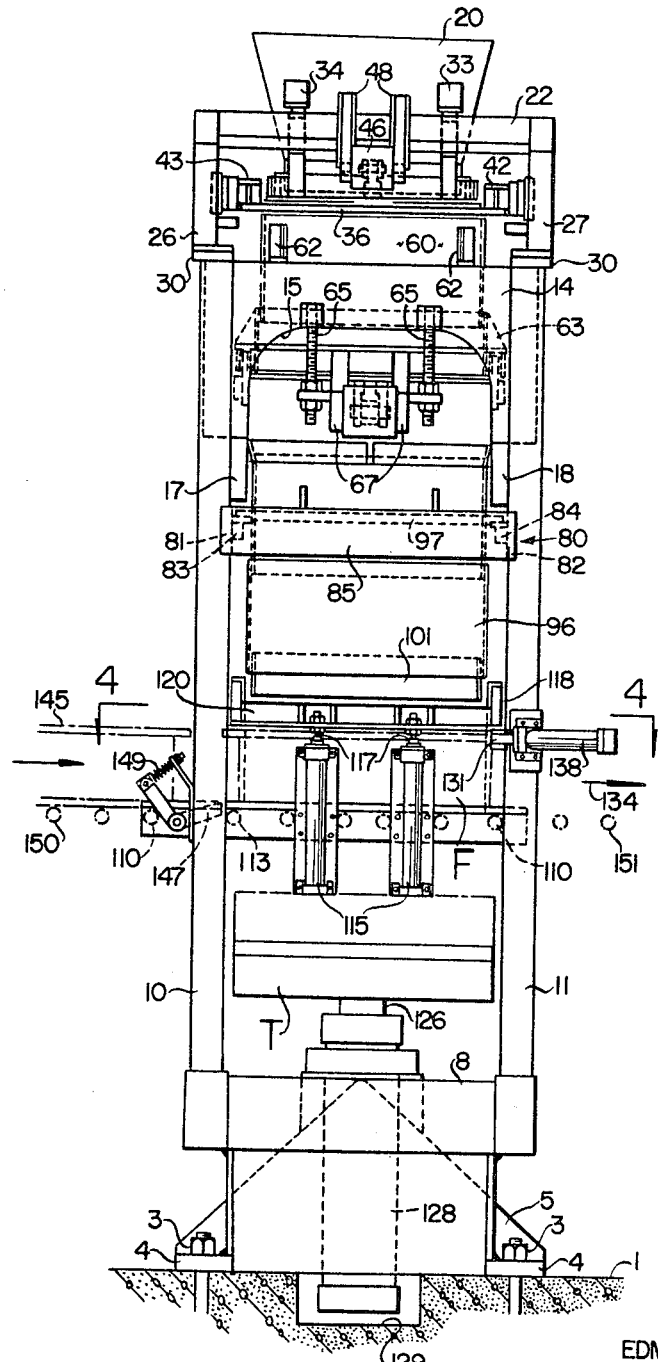
FIG. 2 is a side elevation of such machine as seen from the right in FIG. 1.

Referring now to the annexed drawings and more particularly to the machine shown in FIGS. 1 and 2, it will be seen that such machine is mounted on the floor 1 by means of nut and bolt assemblies 2 and 3 extending through flanges 4 at the corners of the triangular base 5. Transverse frame members 7 and 8 support vertically extending legs 9, 10, 11 and 12. Secured between the top inside of the legs 9 and 12 is a frame plate 13 and similarly a frame plate 14 is secured between the top insides of the legs 10 and 11. Both of these plates are provided with arcuate openings 15 therein as seen more clearly in the end elevation of FIG. 2. Subadjacent the transverse frame members 13 and 14, there is provided two longitudinally extending frame members 17 and 18 extending between the pairs of legs 9, 10 and 11, 12, the member 17 being shown broken away in FIG. 1.

Figure 3:
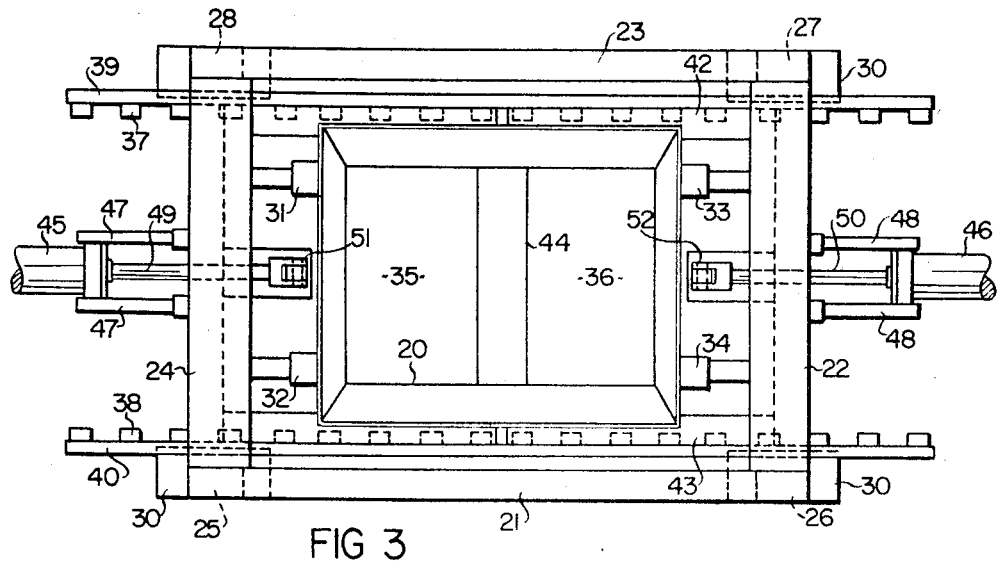
FIG. 3 is a top plan view of the machine of FIG. 1 on a somewhat enlarged scale.

A sand hopper 20 is mounted on top of the machine within a top box frame composed of the members 21, 22, 23 and 24 (note also FIG. 3) with such frame being mounted on relatively short legs 25, 26, 27 and 28, such short legs being provided with bottom flanges or bed plates which are bolted directly to top plates mounted on the legs 9, 10, 11 and 12 as shown at 30. The hopper 20 is secured to the frame members 24 and 22 by means of brackets 31, 32, 33 and 34. A pair of cutoff slides 35 and 36 are supported for horizontal reciprocation on parallel rows of rollers 37 and 38 mounted respectively on roller supporting bars 39 and 40 secured to the legs 28, 27 and 25, 26 as seen in FIG. 3. Each of the plates 35 and 36 are provided with elevated side flanges 42 and 43 as seen in FIG. 2 which enclose the rollers 37 and 38 so that the plates 35 and 36 are employed in cooperation with the flanges to provide grooves in which the rollers fit. A center sand distributing ridge 44 is provided in the hopper and as seen the plates 35 and 36 extend beneath such ridge in the closed position shown. Such plates are actuated for movement by respective piston-cylinder assemblies 45 and 46 which are mounted on pairs of brackets 47 and 48 on the top frame members 24 and 22 respectievly. The rods 49 and 50 of such piston-cylinder assemblies are connected to the cutoff plates 35 and 36 as shown at 51 and 52.

The sand measuring box 60 is positioned subadjacent the cutoff slide plates 35 and 36 on brackets 61 and 62 secured to the tops of the frame plates 13 and 14 respectively. Telescoped over the bottom of the measuring box 60 is a louvered opening assembly 63 mounted on pairs of adjusting screws 64 and 65 mounted on the plates 13 and 14 respectively. Pairs of brackets 66 and 67 are employed to support the assembly through the adjusting screws 64 and 65. The brackets 67 additionally support a piston-cylinder assembly 68, the rod 69 of which is connected to a louver actuating bar 70. This bar pivots louvers 71 which are in turn pivoted to the frame of the assembly 63 to open and close the bottom of the sand measuring box 60. It can now be seen that by adjustment of the screws 64 and 65, the depth of the box or the distance of the louvers from the cutoff plates can closely be controlled thus to increase or decrease the amount of said within the measuring box 60.

Mounted on the legs 9, 10, 11 and 12 beneath the louver opening frame assembly 63, there is provided a carriage supporting frame 80 which includes two elongated side frame members 81 and 82 supporting inwardly directed rows of rollers 83 and 84. The carriage supporting frame 80 includes a transversely extending end frame member 85 and an opposite cylindrical end frame member 86 on which is mounted a piston-cylinder assembly 87 by means of brackets 88. The rod 89 of such piston- cylinder assembly is connected as shown at 90 to the carriage frame 91 of squeeze head 92. The rod 89 is covered by a shield 93 so that when in its extended position it will not be exposed to loose sand falling from the measuring box 60 and the louver assembly 63. The shield 93 is preferably mounted on the carriage frame 91 for movement therewith and thus with the rod 89. The carriage 91 is provided with a top plate 94, the side marginal edges of which overlie the inwardly directed rows of rollers 83 and 84. Such marginal edges also underlie the frame members 17 and 18 (see FIG. 2) when the squeeze head 92 is in the operative squeezing position shown in FIG. 1 to provide a firm top backstop for the squeeze head.

A sand filling chute 96 is similarly mounted on a plate 97 having a central aperture therein and the chute carriage is connected to the squeeze head carirage by links 98. Thus the piston-cylinder assembly 87 is effective horizontally to reciprocate both the squeeze head and the filling chute. Such filling chute includes a flared top portion 99 which receives the sand from the opened louvers 75 and deposits it through the discharge opening 100 in the bottom thereof. A strike-off blade 101 is secured to the bottom edge of the chute to strike off the excess sand on the flask as the chute is moved from the filling position to the position shown in FIG. 1.

The flask F shown in phantom lines is, of course, conventional and is supported on its bottom flange by conveyor rollers 110 inwardly directed from conveyor roller supporting bars 112 and 113. These bars may be bolted or otherwise suitably secured directly to the legs 9 through 12 of the machine frame. Mounted on each bar 112 and 113 are a pair of pneumatic cylinders 114 and 115, the rods of which are connected as shown at 116 and 117 respectively to fill frame 118. As seen in FIG. 2, the fill frame 118 is provided with a depressed center portion in the side walls 119 and 120 thereof to accommodate the strike-off blade 101. The piston-cylinder assemblies 114 and 115 act as air springs to maintain the fill frame in its lowermost position resiliently to be raised by the elevation of the table T which will lift the flask F off the rollers 110 to engage and lift the fill frame 118 against the pressure of the air cylinders 114 and 115 to cause the thus formed mold box composed of the fill frame, flask and table to move upwardly against the squeeze head 92. It is noted that the fill frame 118 and accordingly the flask F and dimensioned peripherally to telescope over the outside of the marginal peripheral dimension of the squeeze head. There will be a very slight peripheral clearance between the fill frame and flask and the marginal portions of the squeeze head 92 as shown by the phantom line position of the flask and fill frame at 121 in FIG. 1. If desired, a brush or like sliding seal may be incorporated between the squeeze head and the fill frame and flask.

The table T is supported on the rods 125 and 126 of hydraulic cylinders 127 and 128 respectively which extend through the apex of the triangular base 5. The blind end of each of the piston-cylinder assemblies may extend into a pit or slight depression 129 in the floor 1.

Figure 4:
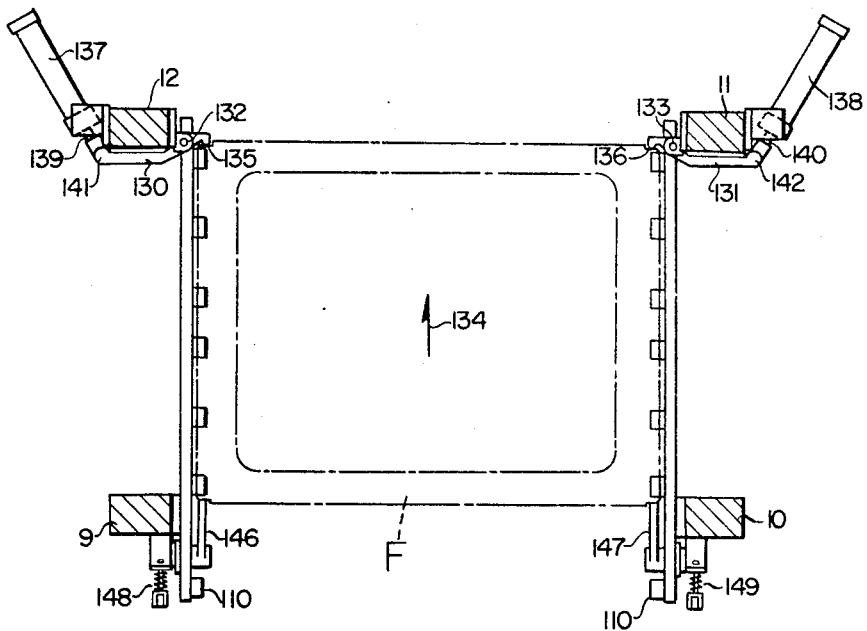
FIG. 4 is a horizontal section taken substantially on the line 4—4 of FIG. 2 illustrating the flask latching mechanisms.

Referring now to FIG. 4, it will be seen that air operated stops 130 and 131 are pivoted to the interior surfaces of the frame legs 12 and 11 respectively as shown at 132 and 133. A flask entering the machine in the direction of the arrow 134 will then engage the distal ends of the stops as shown at 135 and 136 to be in proper position for the loading operation. When the flask is to be taken out of the machine, piston-cylinder assemblies 137 and 138 wil be caused to extend their rods 139 and 140 pivoted to the proximal ends of the latches 130 and 131 as shown at 141 and 142 respectively, thus to pivot the distal ends of such latches clear of the flask so that it may be removed from the machine in the direction of the arrow. A new flask 145 will be pushed into the machine and the previously made mold will be ejected. After the next flask enters the machine, the piston-cylinder assemblies 137 and 138 again retract and the stops are positioned to contact the next flask 145. On the way into the machine, spring loaded latches 146 and 147 are depressed by the bottom of the flask and as it clears the latch mechanisms, springs 148 and 149 return them to the slightly elevated position shown more clearly in FIG. 2 abutting the end or edge of the bottom flask flange to eliminate the possibility of the flask rolling back out of the machine during the molding cycle. In this manner, the flask will firmly be held between the latches 146 and 147 and the stops 130 and 131. Suitable conveyors comprised of rollers similar to those shown at 110 may be employed to convey flasks to the machine as at 150 and to discharge finished molds as at 151.

Figure 5:
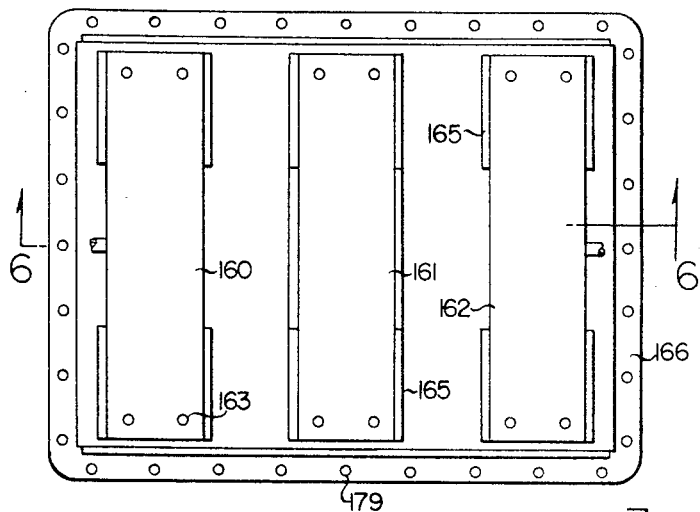
FIG. 5 is a top plan view of the diaphragm squeeze head employed in the machine of FIG. 1.
Figure 6:
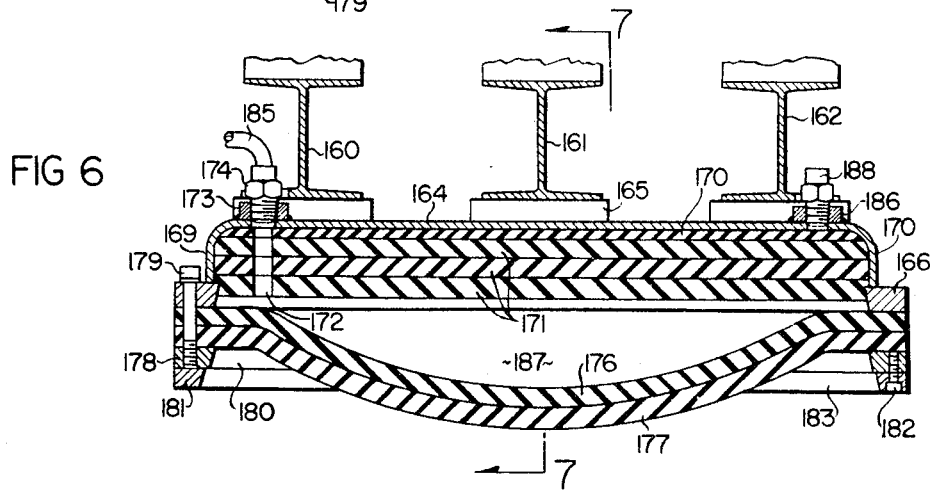
FIG. 6 is a longitudinal vertical section of such squeeze head taken substantially on the line 6—6 of FIG. 5.
Figure 7:
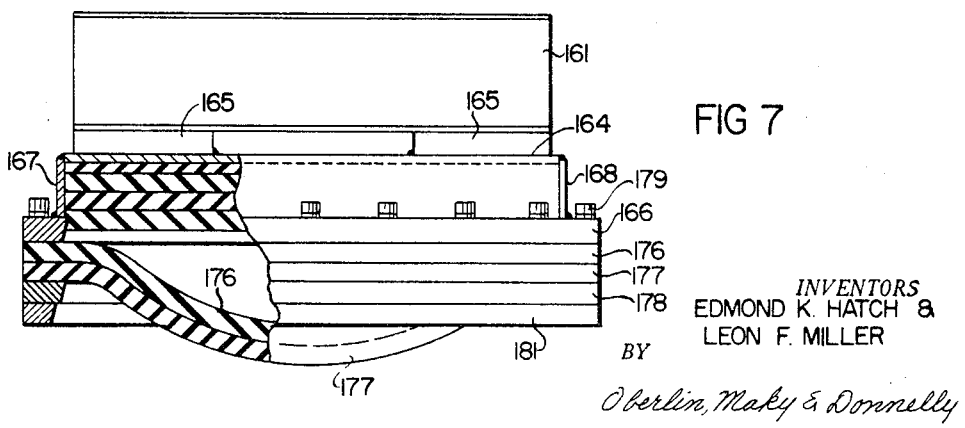
FIG. 7 is a transverse vertical section of such squeeze head taken substantially on the line 7—7 of FIG. 6.

Referring now additionally to FIGS. 5, 6 and 7, it will be seen that the squeeze head 92 employed with the present invention is mounted on the carriage 91 by means of three I-beams 160, 161 and 162 extending transversely there-across. The I-beams may be secured to the carriage 91 by suitable fasteners such as nuts and bolts extending through apertures in the top flanges of the beams as shown at 163. Similarly, the bottom flanges of the beams may be employed to fasten a head or cavity 164 thereto through spacer blocks 165 which may be positioned at opposite ends of each beam. A horizontally extending relatively thick flange member 166 may be secured as by welding to the lower peripheral edge of the cavity member 164. As seen in FIG. 7, the cavity member 164 includes two side plates 167 and 168 which form, with the cavity member 164 having downwardly turned end walls 169 and 170, a downwardly opening cavity which is filled with several layers or blocks of gum rubber. The illustrated embodiment discloses a total of four such layers filling such cavity and such layers may, for example, be totally 3½ inches thick. The top layer 170 may be ½ inch and the other three layers 171 may be 1 inch thick. Aligned openings 172 in such layers lead to a tapped extension 173 on the top surface of the cavity member 164 into which a coupling 174 is threaded.

Two relatively thick diaphragms 176 and 177 are peripherally clamped to the bottom side of the flange or ring 166 by a clamping ring 178 of the same peripheral dimension as the flange 166 and the diaphragms 176 and 177. Such clamping ring is held against the diaphragms thus to clamp the same against the flange by a series of peripherally spaced clamping bolts 179 threaded into the clamping ring 178. It is noted that the interior surface 180 of such ring is slightly outwardly flared and a further ring 181 is secured to the bottom surface thereof by fasteners such as the screws 182. The lower ring 181 also has an outwardly flared interior surface 183 which cooperates with the ring 178 to provide a marginal relatively rigid portion adapted firmly and mechanically to squeeze the periphery of the sand mold, and the interior surfaces 180 and 183 force the sand inwardly to be squeezed by the downwardly bulging relatively thick diaphragms 176 and 177. Air at approximately ¾ pound per square inch will be supplied to the back of the downwardly bulging diaphragms through line 185 coupled to the tapped boss 173. It is noted that a similar tapped boss 186 is employed on the opposite side of the head and either or both may be employed to supply such air under slight pressure to the cavity or space 187 behind the diaphragms 176 and 177. In the embodiment shown, the opening in the tapped boss 186 may be provided with a plug 188. The layers 170 and 171 as well as the diaphragms 176 and 177 may, for example, be "natural gum" rubber, polyurethane rubber, or synthetic rubber such as neoprene. The layers 170 and 171, which serve to reduce the fluid volume behind the diaphragms 176 and 177, may be glued together or otherwise suitably fastened to provide a resilient block or backup for the space behind the diaphragms, the lowermost layer 171 being tailored to fit the interior shoulder on the flange 166. The air under slight pressure will cause the diaphragms 176 and 177 to bulge downwardly as shown. However, during the squeeze operation when it is acting on the sand under pressure, it will tend to flatten out and in high spots of the mold, it will contact and depress the layers 170 and 171. During the molding operation, the pressure provided by the hydraulic cylinders 127 and 128 will raise the trapped ¾ pound per square inch pressure behind the diaphragm to over 100 pounds per square inch thus giving a uniformly hard mold, the back of which will be contoured to the sand and pattern resistance that the diaphragm meets. It can then be seen that with a 30 x 38 x 10 flask that a total of over 100,000 pounds pressure will be exerted behind the diaphragm.

OPERATION OF THE FIG. 1 EMBODIMENT

Referring now more particularly to FIG. 8, it will be seen that the pneumatic components of the machine are operated by a series of four way solenoid power operated valves having manual overrides. The valve 200 operated by solenoid 201 is effective through ½ inch hose lines 202 and 203, for example, to control the operation of the cutoff slide piston-cylinder assemblies 45 and 46. Similarly, valve 204 operated by solenoid 205 is effective through 1 inch hose lines 206 and 207 to operate the piston-cylinder assembly 87 to position the carriage which includes the squeeze head 92 and chute 96 to either squeeze position or fill position. Also, the valve 208 operated by solenoid 209 is effective through lines 210 and 211 which, like the lines 202 and 203, may be ½ inch hose lines to control the operation of piston-cylinder assembly 68 either to open or close the louvers 75. Flow control units 212 comprised of a variable restriction valve and a check valve in parallel may be provided in each of the lines leading to the piston-cylinder assemblies 45, 46, 68 and 87.

A valve 214 operated by solenoid 215 is effective to supply air under pressure selectively during the cycle of the machine through pipes 216 to a pattern blow-off, and similarly a valve 217 operated by solenoid 218 is effective to supply air through lines 219 to a pattern spray unit, not shown. Air for the valves 200, 204, 208, 214 and 217 is supplied from a source 220 through an air line filter 221 which leads to supply line 222. A radial flow exhaust muffler 223 may be provided in exhaust line 224. A branch 225 in the supply line leads to the pairs of upset frame hold-down piston-cylinder assemblies 114 and 115. Such upset cylinders may be provided with a 2½ inch bore and a 14 inch stroke with cushioning at the blind end only.

Hydraulic fluid under pressure may be supplied alternately to the lines 227 and 228 or the line 229 from a hydraulic power unit, respectively to raise and lower the table T through the piston-cylinder assemblies 127 and 128. The hydraulic power unit which may, for example, be one commercially sold by Brown & Sharpe will have a pressure responsive device so that when the desired pressure is obtained, the pressure will be switched from lines 227 and 228 to line 229. As the table with the flask supported therein descends and as the flask approaches the rollers 110, the downward speed of the table will be slowed or reduced so that the drawing of the pattern from the produced sand molds will be at a relatively low speed. The table may be provided with a bracket 231 having a cam 232 thereon adapted to operate a vibrator valve 233 supplied through lines 234 which leads through valve 200 so that the vibrator will be operative only when the cutoff plates 35 and 36 are closed and when the valve 233 is open governed by the position of the table T. The vibrator may be employed to assist in the compaction of the sand within the flask and/or to facilitate the drawing operation.

Air may be supplied to a pressure regulating valve 236 which will increase the pressure in line 237 until a diaphragm type unloading valve 238 unloads, such valve being set to unload at 1 pound per square inch. When the valve 238 relieves, the setting of the valve 236 can be reduced one turn so that the pressure supplied through check valve 239 through line 185 to the chamber 187 behind the diaphragm will remain somewhat less than 1 pound per square inch or ¾ of a pound per square inch.

The latch operating piston-cylinder assemblies 137 and 138 may be operated, for example, through lines 240 and 241 with a flow control unit 242 being provided in the line 240 leading to the blind end of the piston-cylinder assembly 137. The air supply in such lines can be controlled by suitable solenoid operated valves signalling the condition of the machine at the completion of the cycle so that the flask F can be cleared for movement from the machine.

With the machine shown in the position of FIG. 1, the first operation is to shuttle the squeeze head out from under the measuring box 60 with the carriage pneumatic piston-cylinder assembly 87. At the same time, the hydraulic squeeze pistons 127 and 128 will raise the table with the pattern and plate P positioned thereon lifting the flask F from the rollers 110 until the flask contacts the upset frame 118. When the flask and upset are in contact, the table stops rising and the louvers of the sand box are opened by the piston-cylinder assembly 68 for the desired length of time. Since the upper cutoff slides 35 and 36 are closed whenever the louvers 75 are opened, only the amount of sand, which is determined by the height of the lower assembly 63, within the measuring box 60 is dropped into the flask. The sand will drop through the chute 96 which has been placed in alignment between the measuring box 60 and the flask F. Before the table again begins to move upwardly, the squeeze head end chute will be shuttled to the position shown in FIG. 1 by the extension of the piston-cylinder assembly 87. The movement of the chute will cause the excess sand within the flask and fill frame to be struck off. When in the position shown, the table will start to move upwardly and the live air on the rod end of the pairs of cylinders 114 and 115 holding the fill frame down will be compressed and forced back into the supply line 225. Continued upward movement of the table causes the sand within the flask and fill frame to be compressed to a hardness which is a function of the hydraulic pressure in the squeeze cylinders 127 and 128. When the desired pressure is obtained, the cycle is reversed and the flask and fill frame will start to lower away from the head with the live air which is kept on the rod end of the pairs of cylinders 114 and 115 keeping the upset on top of the flask as it is lowered. As the flask approaches the rollers 110, the downward speed of the table T is reduced to slow the drawing operation and continued downward movement of the table will draw the pattern from the sand mold. The latching piston-cylinder assemblies 137 and 138 will then be actuated to clear the flask for discharge from the machine and a new flask 145 will be positioned in its place so that the above-described cycle may be repeated.

It can now be seen that there is provided a foundry molding machine which will very rapidly produce foundry sand molds of uniform high surface hardness having squeeze heads capable of withstanding high pressures and constant uses, such squeeze heads conforming to the requisite of the pattern, barred flasks, gates, sprues or the like depending upon the particular arrangement desired. For example, it has been calculated that the hydraulic cycle time of the machine need only be 6.6 seconds with the approach taking 2.3 seconds, the squeeze taking 1.5, and the draw 2.8. Rugged squeeze heads providing an equalizing pressure on the entire upper surface of the molds thus rapidly produced are disclosed which can additionally take the continual horizontal reciprocating movements required in the gravity fill machines illustrated.

Other modes of applying the principle of the invention may be employed, change being made as regards the details described, provided the features stated in any of the following claims or the equivalent of such be employed.

We, therefore, particularly point out and distinctly claim as our invention:

1. A foundry molding machine comprising an upstanding frame, a table vertically movable in said frame, squeeze means operative to elevate said table, means to position a flask within said frame to be engaged and elevated by said table, a fill frame vertically movable within said frame when engaged by said flask to form with such flask and table a mold box, a horizontally reciprocable carriage mounted on said frame above said fill frame including a squeeze head and a sand chute, means to reciprocate said carriage to position said sand chute for filling such mold box with sand and when so filled to replace said chute with said squeeze head, said squeeze head including an adaptable sand engaging surface which will generally conform to such sand within such flask while exerting a uniform pressure over the top surface of such sand therein when the table is further elevated to squeeze such sand within such mold box against said squeeze head, said squeeze head comprising a fluid backed double thickness diaphragm and a rubber block backing for said diaphragm.

2. A foundry molding machine comprising an upstanding frame, a table vertically movable in said frame, squeeze means operative to elevate said table, means to position a flask within said frame to be engaged and elevated by said table, a fill frame vertically movable within said frame when engaged by said flask to form with such flask and table a mold box, a horizontally reciprocable carriage mounted on said frame above said fill frame including a squeeze head and a sand chute, means to reciprocate said carriage to position said sand chute for filling such mold box with sand and when so filled to replace said chute with said squeeze head, said squeeze head including an adaptable sand engaging surface which will generally conform to such sand within such flask while exerting a uniform pressure over the top surface of such sand therein when the table is further elevated to squeeze such sand within such mold box against said squeeze head, said squeeze head comprising a downwardly opening cavity, and means to supply fluid under slight fluid pressure to such cavity, relatively thick diaphragm means extending across the bottom of such cavity, and rubber block filler means within such cavity to restrict the volume of such fluid under pressure therein.

3. A squeeze head for foundry molding machines comprising a downwardly opening cavity member, peripheral flange means on said cavity member, a clamping ring of the same marginal dimension as said peripheral flange means, thick diaphragm means clamped marginally peripherally between said clamping ring and said flange means extending across the opening of said cavity member, means to provide a slight fluid pressure backing in said cavity member to cause said thick diaphragm means to bulge slightly outwardly, and rubber block means in said cavity means spaced from said thick diaphragm means restricting the volume of fluid behind said diaphragm means and serving to cushion and resiliently back up said diaphragm means.

4. A squeeze head for foundry molding machines comprising a downwardly opening cavity member, peripheral flange means on said cavity member, a clamping ring of the same marginal dimension as said peripheral flange means, thick diaphragm means clamped marginally peripherally between said clamping ring and said flange means extending across the opening of said cavity member, means to provide a slight fluid pressure backing in said cavity member to cause said thick diaphragm means to bulge slightly outwardly, and rubber block means behind said diaphragm means restricting the volume of fluid within said cavity member.

5. A squeeze head for a foundry molding machine, which comprises a downwardly opening cavity member with a peripheral flange, a clamping ring of the same marginal dimension as the peripheral flange and a thick diaphragm clamped along its peripheral edge between the clamping ring and the flange and extending across the opening of said cavity member, a slight fluid pressure backing being provided in the cavity member to cause the diaphragm to bulge slightly outwardly, and rubber block means behind the diaphragm restricting the volume of fluid within the cavity member.

6. A squeeze head according to claim 5 wherein the rubber block means is spaced from the diaphragm.

References Cited by the Examiner

UNITED STATES PATENTS

| | | | |
|---|---|---|---|
| 1,260,002 | 3/1918 | Lanhoffer. | |
| 2,686,345 | 8/1954 | Young | 22—35 |
| 2,962,776 | 12/1960 | Taccone | 22—42 |
| 2,968,846 | 1/1961 | Miller | 22—36 |
| 3,041,685 | 7/1962 | Taccone | 22—42 |
| 3,123,873 | 3/1964 | Taccone | 22—42 |

J. SPENCER OVERHOLSER, *Primary Examiner.*

MARCUS U. LYONS, *Examiner.*